(12) United States Patent
Moore et al.

(10) Patent No.: US 9,098,537 B2
(45) Date of Patent: Aug. 4, 2015

(54) TECHNIQUES FOR ALIGNED RUN-LENGTH ENCODING

(71) Applicant: Oracle International Corporation, Redwood Shores, CA (US)

(72) Inventors: Kevin Moore, San Francisco, CA (US); Aarti Basant, San Mateo, CA (US); Brian Gold, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 12 days.

(21) Appl. No.: 13/722,867

(22) Filed: Dec. 20, 2012

(65) Prior Publication Data

US 2014/0181052 A1 Jun. 26, 2014

(51) Int. Cl.
*G06F 17/30* (2006.01)

(52) U.S. Cl.
CPC ................................ *G06F 17/30306* (2013.01)

(58) Field of Classification Search
USPC .................................................. 707/687, 693
See application file for complete search history.

(56) References Cited

U.S. PATENT DOCUMENTS

| | | | | |
|---|---|---|---|---|
| 6,115,497 A * | 9/2000 | Vaezi et al. | .................... | 382/174 |
| 6,628,411 B2 * | 9/2003 | Miller et al. | .................... | 358/1.1 |
| 7,072,530 B2 * | 7/2006 | Michinaka | .................... | 382/306 |
| 7,218,670 B1 * | 5/2007 | Lesea et al. | .................... | 375/226 |
| 7,389,007 B2 * | 6/2008 | Michinaka | .................... | 382/305 |
| 7,502,815 B1 * | 3/2009 | Drimer | .................... | 708/255 |
| 7,984,462 B2 * | 7/2011 | Deng | .................... | 725/19 |
| 8,150,152 B2 * | 4/2012 | Shiraishi | .................... | 382/166 |
| 8,290,931 B2 * | 10/2012 | Hong et al. | .................... | 707/713 |
| 8,321,485 B2 * | 11/2012 | Yasuda et al. | .................... | 707/830 |
| 8,700,674 B2 * | 4/2014 | Bear et al. | .................... | 707/802 |
| 8,935,223 B2 * | 1/2015 | Ganesh et al. | .................... | 707/693 |

* cited by examiner

*Primary Examiner* — Kim Nguyen
(74) *Attorney, Agent, or Firm* — Hickman Palermo Becker Bingham LLP (57) ABSTRACT

Techniques for Aligned Run-Length Encoding (ARLE) are described. ARLE is an encoding scheme that transforms sets of same-valued consecutive rows into one or more runs, while enforcing boundaries between the runs at set intervals (e.g. every predetermined number of rows). Consecutive rows that contain the same value, but which cross one or more interval boundaries, are encoded as multiple runs that are divided along those interval boundaries. According to one technique, a database server accelerates query processing by setting the interval size to the word size of the processor performing the predicate comparisons. According to another technique, a database server accelerates row lookup by maintaining an offset array that stores the run offsets into the ARLE data of the run that begins each interval.

20 Claims, 9 Drawing Sheets

600 ARLE Data

| Index | Data | Length |
|---|---|---|
| 0 | Smith | 18 |
| 1 | Jones | 12 |
| 2 | Allen | 2 |
| 3 | Allen | 7 |
| 4 | Johnson | 25 |
| 5 | Johnson | 10 |
| 6 | Thomas | 22 |

601 ARLE Data

| Index | Data | Length |
|---|---|---|
| 0 | California | 18 |
| 1 | New Jersey | 12 |
| 2 | Alabama | 2 |
| 3 | Alabama | 7 |
| 4 | New Mexico | 25 |
| 5 | Nevada | 10 |
| 6 | Maryland | 22 |

602 Query

LastName="Allen" OR StateOfBirth="Maryland"

603 Output Bit Vector

0..010...0|1111...1|0..0|0..010.....0

604 Output Bit Vector

0..010..0|0100|0...0|0..0|0..0|1.....1

605 Query Bit Vector

TECHNIQUES FOR ALIGNED RUN-LENGTH ENCODING

FIELD OF THE INVENTION

The techniques presented herein are directed towards aligned run-length encoding.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Systems

A database server manages a database. A database comprises database data and metadata that is stored on a persistent memory mechanism, such as a set of hard disks. In a database, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. However, other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer to the data container, record, and field respectively.

Database applications and clients interact, directly or indirectly, with the database by submitting database commands that cause the database server to perform operations on the data stored within the database. A database command may be in the form of a database statement that conforms to a database language, such as Structured Query Language (SQL). However, although the example described above is based on SQL, the techniques provided herein are not limited to any version of SQL, standard or proprietary, or any particular form of database command or database language.

Run Length Encoding

Run-Length Encoding (RLE) is a compression scheme in which repeated values are stored once along with the number of consecutive repetitions (the run length). RLE is commonly used to compress data in column-oriented databases. For example, consecutive rows of a database table containing the same column value can be represented by an RLE entry (referred to as a "run") containing the column value and the number of consecutive rows. RLE is very effective at compressing many database columns and can be applied in combination with other compression schemes such as dictionary and/or delta encodings.

In addition to saving space, RLE can accelerate query processing by comparing each predicate only once per run and repeating the result for the number of rows represented by the run. If the comparison is expensive, operating on RLE data can be much faster. For simple comparisons (e.g., comparing integers to a constant) the overhead of determining the length of the run and replicating the result can outweigh the savings from reducing the number of comparisons.

An execution strategy for column-oriented query processing is to record a bit-vector representing the binary output of a predicate (one bit for each row). Typically, the bit-vector is constructed by traversing the runs in order and at each run outputting the result of the predicate comparison onto the next N bits of the bit vector, where N is the run length. Producing an output bit vector for RLE data is particularly challenging because for each run, the length of the run must be compared to the number of bits remaining in the active word of the bit vector (the word loaded into working memory) and exception handling performed in case the run length exceeds the remaining space. For example, the exception handling may include recording the number of remaining bits to spill over onto the next word, loading the next word into working memory, and outputting the remaining bits. Since a given query may require multiple predicate comparisons to be performed during runtime, time spent on exception handling can have a significant impact on the efficiency of query processing.

A word, as defined in this application, is a fixed sized group of bits that are handled as a unit by the instruction set and/or hardware of the processor performing the predicate comparison. The size of a word is reflected in many aspects of a computer's structure and operation. For example, the majority of the registers in a processor are usually word sized and the largest piece of data that can be transferred to and from working memory in a single operation is a word in many architectures.

Another difficulty to operating on RLE data is extracting a particular row's value based on the row's index number. To determine which run contains the desired row, the query-processing engine must add up the lengths of all runs prior to the target row. For example, the query-processing engine may traverse the runs in order and accumulate run lengths until reaching a run which meets or exceeds the row's index number. To accelerate access to individual rows, an additional data structure may be stored alongside the RLE data. This additional data structure, the cumulative-run-length array (CRLA), stores the sum of all run-lengths at each run of the RLE data. Alternatively, to save space, the CRLA can be stored only for each multiple of a number of runs. To find the value corresponding to a particular row, the CRLA is searched (e.g. with binary search) to find the index of the run that represents the target row. If the CRLA is stored at a coarse granularity, the query engine must then perform a linear walk of the RLE data starting from the run at the nearest index in the CRLA.

BRIEF DESCRIPTION OF THE DRAWINGS

The present invention is illustrated by way of example, and not by way of limitation, in the figures of the accompanied drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Operating Environment
3.0 Aligned Run Length Encoding
4.0 Predicate Comparison
5.0 Row Lookup
6.0 Optimizations
7.0 Hardware Overview

1.0 General Overview

The techniques described herein are directed towards an encoding, referred to as Aligned Run-Length Encoding (ARLE), which enforces a break between runs at fixed points in order to accelerate operations such as predicate comparison and row lookup.

According to an embodiment, a database server inspects column data in order (e.g. low row index to high row index or vice versa) and encodes sets of same-valued consecutive rows as one or more runs containing the common value and the number of rows in the corresponding set. However, unlike techniques such as RLE, the database server ensures that there is a break between runs at set intervals (e.g. every predefined number of rows). Consecutive rows that contain the same value, but which cross one or more interval boundaries, are encoded as multiple runs that are split along those interval boundaries.

As mentioned above, one common technique for performing predicate comparison on RLE data is to construct a bit vector where each bit represents whether the corresponding row satisfies a particular predicate. For example, a database server may construct the bit vector by performing the predicate comparison on each run of the RLE data in order and output the result of each comparison onto the next N bits of the bit vector, where N is the run length. In some cases, the above example is implemented as a nested loop, where the inner loop fills in the active word currently loaded into the processor's working memory and the outer loop loads the next word of the bit vector. However, this type of predicate comparison on RLE data requires costly exception handling to be performed in the event that the next N bits crosses a word boundary. For example, the database server may have to check for an overflow, record the number of bits remaining for the current run, and output the remaining bits during the next iteration of the inner loop.

In an embodiment, ARLE obviates the need to perform the exception handling described above by setting the number of rows in each interval to the word size of the processor performing the predicate comparisons. As a result, each interval represents the rows that will be processed during a particular inner loop. Since the runs encoded from those rows respect the interval boundaries, all the runs processed during a given inner loop are guaranteed to have an output that falls within a single word of the bit vector. Thus, since there is no risk that a run will cause an output that crosses a word boundary, the database server can save processing time that would otherwise be dedicated to exception handling.

Also mentioned above, in RLE, one common technique to extract the value of a particular row given the row's index number is to construct a CRLA, which stores the sum of all run-lengths at each run of the RLE data. Thus, to find the value of a row at a particular index number, the CRLA is searched (e.g. with binary search) to find the offset of the run which represents the row. Alternatively, in cases where the CRLA is sparsely populated to save space, the CRLA is searched to find the offset of the closest run, followed by a linear walk through the RLE data starting at that offset. One reason that the CRLA needs to be "searched", rather than indexed directly, is because each run of the RLE encoded data may represent any variable number of rows without limitation. As a result, there is no relationship between a row's index number and the offset of the run representing that row which can be exploited to directly locate an entry in the CRLA.

On the other hand, ARLE ensures a break between runs at set intervals, imposing a structure on the encoded data which can be used to accelerate row lookup. In an embodiment, the ARLE data is stored alongside an additional structure, referred to as an offset array. The offset array contains entries that, for each interval, specify the offset into the ARLE data of the run that begins the interval. Given a particular row's index number, the entry in the offset array, and thus the interval which contains the run representing the particular row, can be computed by the database server based on the row's index number and the interval size. The database server then performs a linear walk on the ARLE data, starting at the offset specified by the offset array, until the run representing the particular row is located.

To understand the potential benefit of row lookup using the above embodiment, a comparison between RLE and ARLE is provided. For RLE, assuming a binary search, determining a row's value would take $O(\log(N/L))$ (search of the CRLA)+ $O(L)$ (linear walk through the RLE data), where N represents the number of runs in the RLE data and L represents the multiple at which CRLA entries are stored. However, for ARLE, determining a row's value would take $O(1)$ (direct calculation into the offset array)+$O(I)$ (linear walk through an interval), where I is the size of the interval. As a result, while RLE scales based on the total number of runs encoded, ARLE scales based on interval size, which is a fixed number. Row lookup for ARLE is therefore bounded regardless of the size or composition of the data being encoded. For data sets which produce a large number of runs, row lookup using ARLE can therefore result in a significant reduction in processing time.

2.0 Operating Environment

Figure 1:
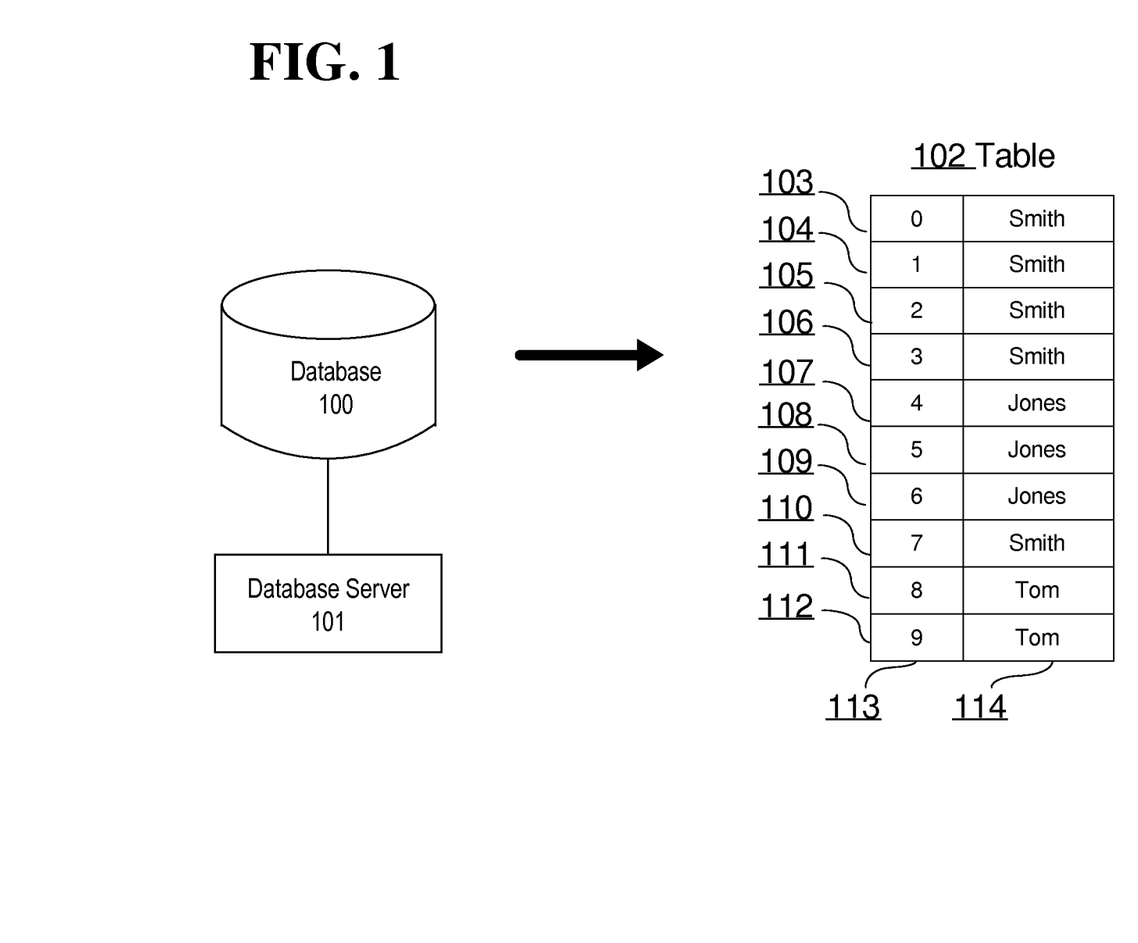
FIG. 1 is a block diagram illustrating an example operating environment upon which an embodiment of the present invention may be implemented.

FIG. 1 is a block diagram illustrating an operating environment upon which an embodiment of the present invention may be implemented. Techniques described herein may be implemented on database server 101 to facilitate managed storage of data on database 100, such as table 102. Table 102 consists of a plurality of records corresponding to rows 103-112. Each row in table 102 has a row index corresponding to column 113 and a data field corresponding to column 114. Although not depicted in FIG. 1, database 100 may in fact contain many other database tables, database objects, data, and metadata that can be managed by database server 101.

In an embodiment, database server 101 is implemented on one or more computing devices that are communicatively coupled to database 100. An example of a computing device upon which database server 101 may be implemented is described below in the "Hardware Overview". In some embodiments, database server 101 is configured to accept user commands, such as such as Data Definition Language (DDL) and Data Manipulation Language (DML) instructions, and carry out those commands on database 100. Database server 101 may be communicatively coupled to database 100 directly, such as by a computer bus, or indirectly over one or more local area networks (LANs) and/or wide area networks (WANs). In one embodiment, database server 101 is communicatively coupled to database 100 over the Internet.

In an embodiment, database 100 is implemented on one or more storage devices, such as an array of hard drive disks, random-access memory (RAM), tape drives, flash drives, optical drives, or combinations thereof. However, storage devices other than those listed above may also be used to implement database 100. In addition, although database 100 is depicted as a single entity within FIG. 1, database 100, in some embodiments, may be distributed across many different storage devices located at many different physical locations.

3.0 Aligned Run Length Encoding

ARLE is an encoding scheme that transforms sets of same-valued consecutive rows into one or more runs, while enforcing boundaries between the runs at set intervals (e.g. every predetermined number of rows). Consecutive rows that contain the same value, but which cross one or more interval boundaries, are encoded as multiple runs that are divided along the interval boundaries. However, the exact technique used to encode data to adhere to the ARLE format is not critical to the techniques described herein.

In an embodiment, the database server 101 scans the rows 103-112 of the table 102 in order (e.g. highest index to lowest index or vice versa) and keeps track of the number of same-valued consecutive rows encountered. If a threshold number of rows have been scanned since the last enforced boundary, or if the database server 101 encounters a row that breaks the chain (contains a different value), the database server outputs a run containing the number of consecutive rows along with the common value. The database server 101 continues the scan and builds runs from the remaining rows in the same fashion.

Figure 2:
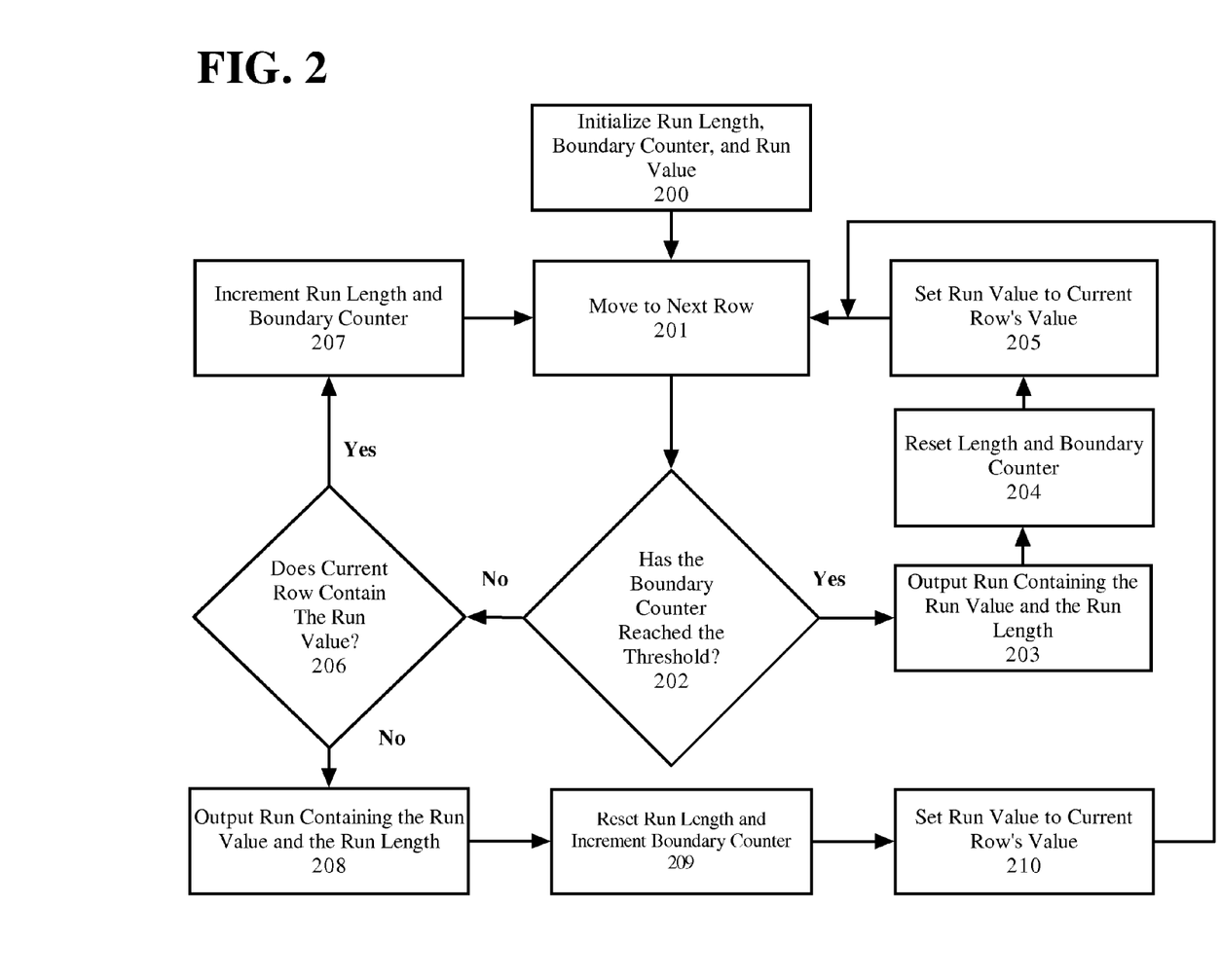
FIG. 2 is a block diagram that illustrates tabular data being encoded using ARLE according to an embodiment.

FIG. 2 is a block diagram that illustrates tabular data being encoded using ARLE according to an embodiment. To illustrate clear examples, it will be assumed that database server 101 performs the technique depicted in FIG. 2 on column 114 of table 102. In some embodiments, ARLE may be used to encode more than one field of a database table. Thus, the flow diagram of FIG. 2 may be repeated for each column being encoded.

At block 200, database server 101 initializes a run length, a boundary counter, and a run value. The run length represents the number of same-valued consecutive rows encountered while constructing the current run, the boundary counter represents the number of rows encountered since the last enforced boundary, and the run value represents the data value for the current run. In an embodiment, database server 101 initializes by inspecting the first row 103 of the table 102, setting the run value to the data value in the column 114 of the first row 103, and setting the run length and boundary counter to indicate one row.

At block 201, the database server 101 moves to the next row. In some embodiments, the database server 101, upon determining that the current row is the last row 112 of table 102, outputs a final run containing the run value and the run length to complete the encoding.

At block 202, the database server 101 determines whether the boundary counter has reached a threshold number of rows. The threshold number of rows corresponds to the size of the intervals at which the ARLE boundaries will be enforced. In some embodiments, the threshold number of rows is predefined. However, in other embodiments, the database server 101 may be configured to accept a command that allows the threshold to be set by a user. In response to a determination that the boundary counter has reached the threshold, database server 101 proceeds to block 203. In response to a determination that the boundary counter has not reached the threshold, database server 101 proceeds to block 206.

At block 203, the database server 101 terminates the current run by outputting the run value and the run length. At block 204, the database server 101 resets the run length and the boundary counter back to indicating one row. At block 205, the database server 101 sets the run value to the value of the current row.

At block 206, the database server 101 determines whether the current row contains the run value. In response to a determination that the current row contains the run value, the database server 101 proceeds to block 207. In response to a determination that the current row does not contain the run value, the database server 101 proceeds to block 208.

At block 207, the database server 101 increments the run length and the boundary counter.

At block 208, the database server 101 outputs a run containing the run value and the run length. At block 209, the database server resets the run length back to indicating one run and increments the boundary counter. At block 210, the database server 101 sets the run value to the value of the current row.

Figure 3:
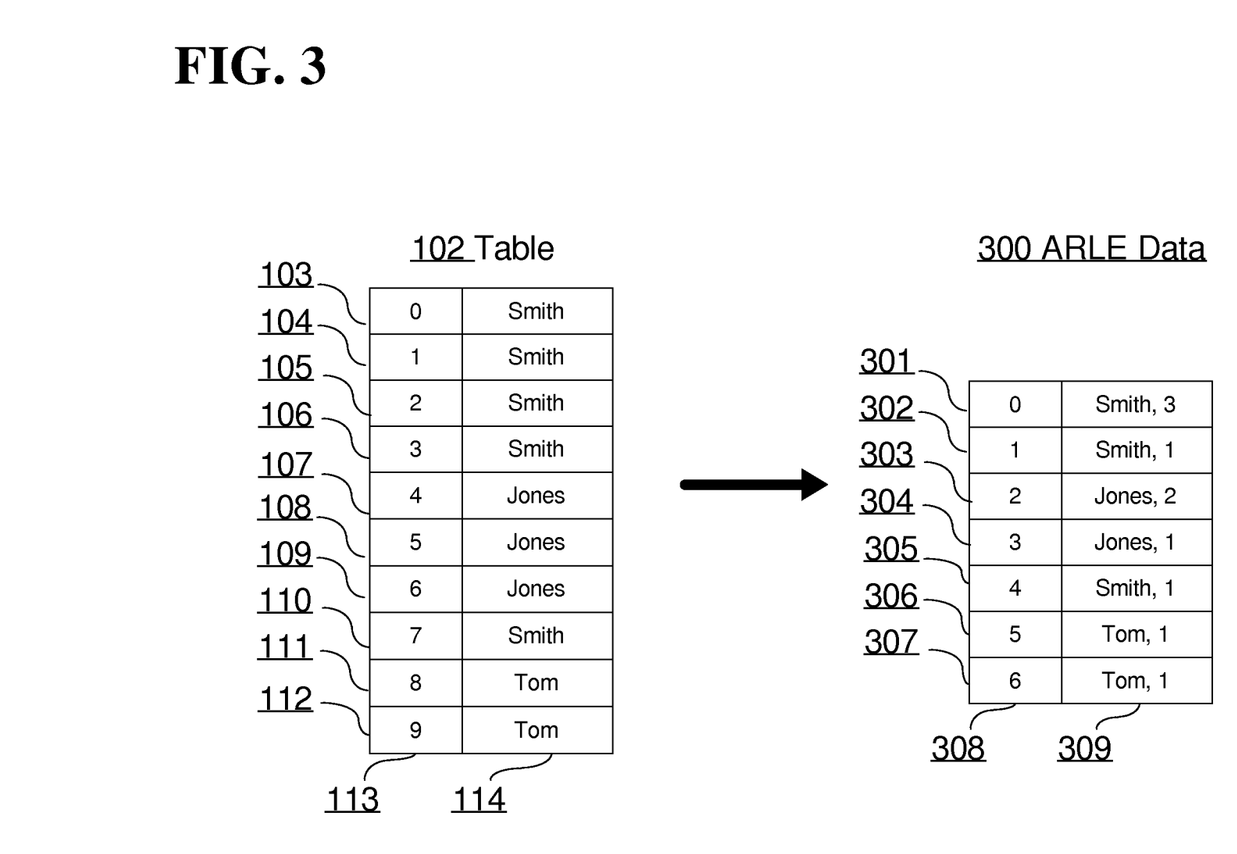
FIG. 3 illustrates a table after a column has been encoded using ARLE according to an embodiment.

FIG. 3 illustrates how the table 102 of FIG. 1 appears after column 114 has been encoded using ARLE according to an embodiment. The example of FIG. 3 assumes that the interval length (number of rows in each interval), has been set to three rows. Thus, a boundary is enforced after row 105, row 108, and row 111. The runs 301-307 of the ARLE data 300 are displayed in a tabular format, where the offset of each run is represented by column 308, and the data value/run length pair is represented by column 309. However, the ARLE data 300 is not limited to the representation portrayed in FIG. 3 and may be stored or displayed in any number of different formats.

In FIG. 3, the first four consecutive rows contain the common data value "Smith". However, since the interval size has been set to three, a run that represents all four rows would cross the first interval boundary after row 105. As a result, database server 101 encodes rows 103-106 as two distinct runs, run 301 representing the first three rows 103-105 and run 302 representing the remaining row 106. The second interval boundary after row 108 similarly splits consecutive rows 107-109 which contain the common value "Jones". As a result, the database server 101 encodes rows 107-108 as run 303 and row 109 as run 304. Row 110, containing the value "Smith", is the only consecutive row with that value and is encoded by the database server 101 as run 305. The third interval boundary after row 111, splits consecutive rows 111-112, each containing the value "Tom". Thus, the database server 101 encodes row 111 as run 306 and row 112 as run 307.

4.0 Predicate Comparison

In some embodiments ARLE can obviate the need to perform certain types of exception handling, such as overflow operations, during predicate comparisons by setting the interval size to the word size of the processor.

Figure 4:
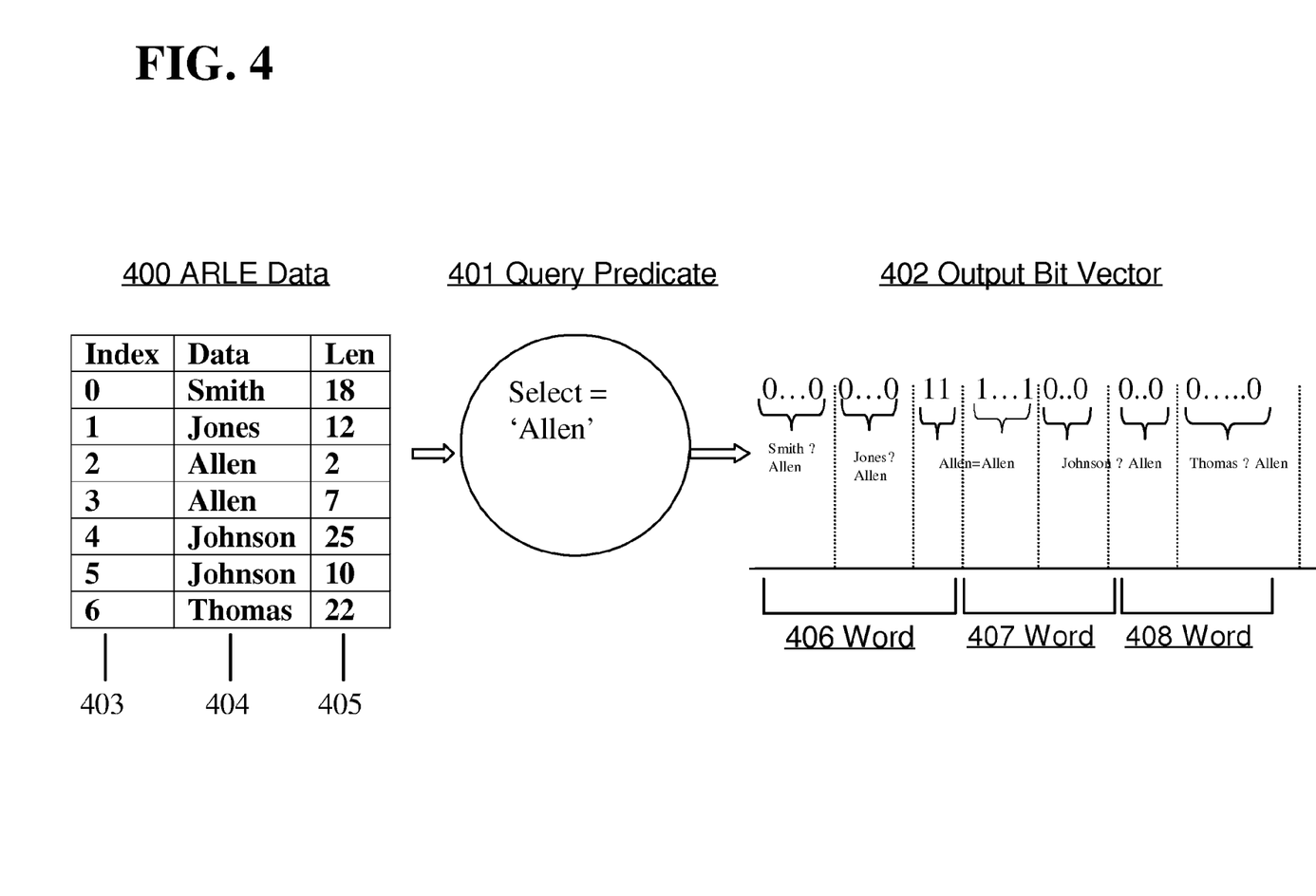
FIG. 4 illustrates the result of performing a predicate comparison on ARLE data according to an embodiment.

FIG. 4 illustrates the result of performing a predicate comparison on ARLE data 400 according to an embodiment. In order to illustrate a clear example, FIG. 4 assumes that ARLE data 400 is aligned at 32 row intervals and that the word size of the processor performing the comparison is 32 bits. In FIG. 4, ARLE data 400 is represented in tabular format, where column 403 represents the offset of individual runs, column 404 represents the data value of each run, and column 405 represents the run length of each run. The combined run lengths, and thus the total number of rows represented by the ARLE data 400, is 96. The rows represented by the ARLE data 400 will be referenced as rows 0-95. Database server 101 executes query predicate 401 against ARLE data 400, resulting in output bit vector 402. The output bit vector 402 comprises word 406 (representing the result for rows 0-31), word 407 (representing the result for rows 32-64), and word 408 (representing the result for rows 65-95). Since the ARLE data is aligned at 32 row intervals, an enforced boundary after rows 31, 64, and 95 ensures that the end of each word also constitutes the end of a run.

In an embodiment, database server 101 performs predicate comparison using a nested loop structure, where the inner loop fills in the word of the output bit vector 402 currently loaded into working memory (the "active" word of the bit vector), and the outer loop loads the next word into working memory. During the inner loop, the database server 101 progresses through the runs of the ARLE data 400, comparing the query predicate 401 to the data value 404 of each run. The result of the comparison is output onto the next N bits of the active word, where N is the run length 405 of the compared run.

Figure 5:
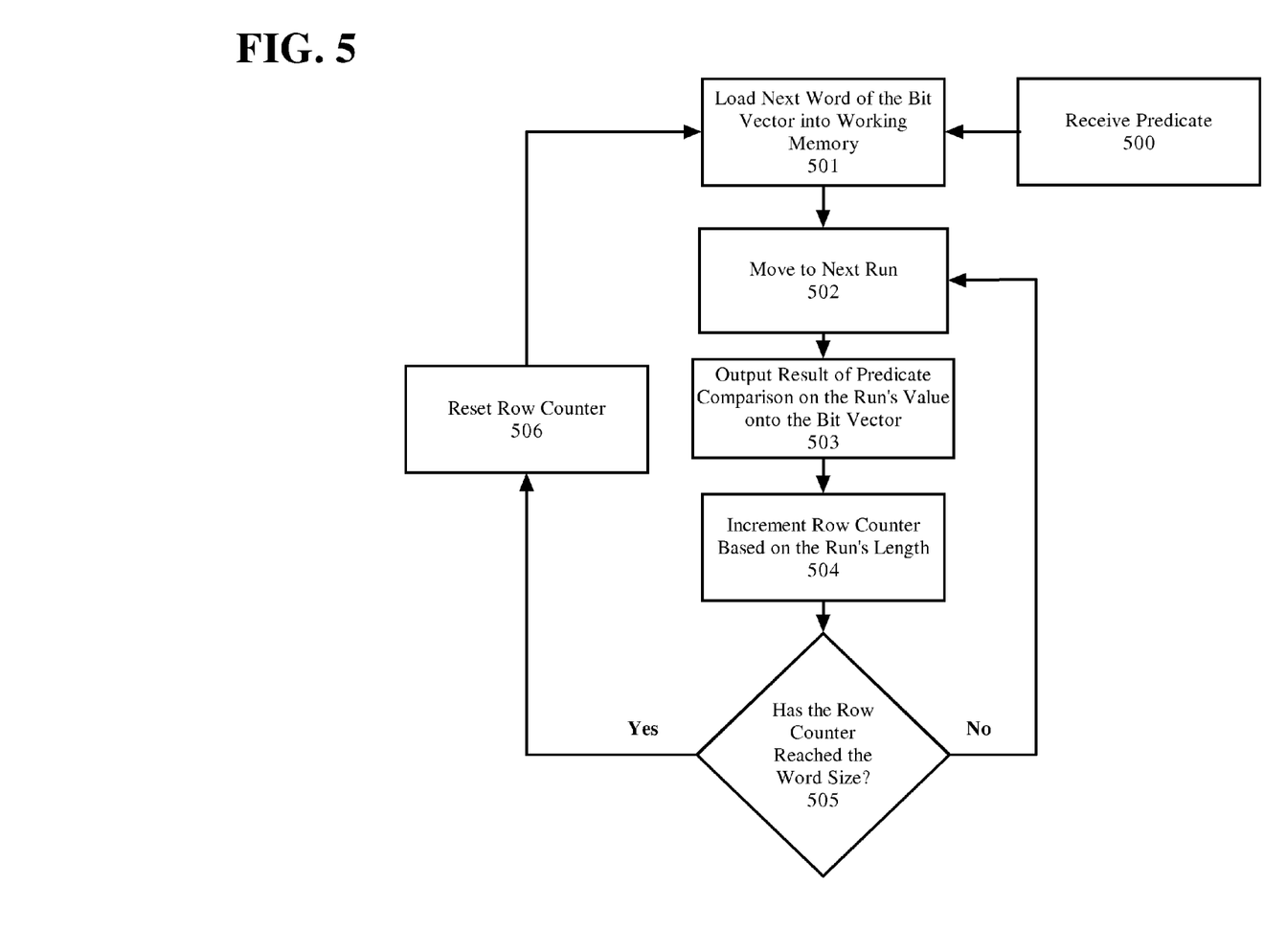
FIG. 5 illustrates a block diagram that performs predicate comparison according to an embodiment.

FIG. 5 illustrates a block diagram that performs predicate comparison according to an embodiment of the present invention. In order to illustrate a clear example, it will be assumed that FIG. 5 is performed by database server 101 to execute query predicate 401 against ARLE data 400, resulting in output bit vector 402.

At block 500, database server 101 receives query predicate 401 to compare against the ARLE data 400. In an embodiment, database server 101 receives query predicate 401 as part of a user query containing one or more query predicates.

At block 501, database server 101 loads the next word of the bit vector into working memory.

At block 502, the database server 101 moves to the next run of the ARLE data 400.

At block 503, the database server 101 compares the query predicate 401 to the current run's data value 404 and outputs the result onto the next N bits of the active word, where N is the run length 405 of the current run. In some embodiments, the database server 101 may receive more than one predicate to apply to the ARLE data 400. For example, the query may contain multiple predicates which reference the column represented by ARLE data 400. In such cases, the database server 101 may perform all the applicable predicate comparisons for the ARLE data 400 at block 503 and output the result onto the next n bits of the active word.

At block 504, the database server 101 increments a row counter based on the run length 405 of the current run. The row counter keeps track of the total number of bits that have been output onto the active word and is used by the database server 101 to determine when to transfer from the inner loop (represented by blocks 502-505) to the outer loop (represented by blocks 501-506).

At block 505, the database server 101 determines whether the row counter has reached the word size. In response to a determination that the row counter has not reached the word size, the database server 101 continues the inner loop at block 502. In response to a determination that the row counter has reached the word size, the database server 101 resets the row counter at block 506 and begins the next iteration of the outer loop at block 501.

Since in FIG. 4 the ARLE intervals have been set to the word size of the processor, the output of the inner loop (blocks 501-504) is guaranteed to never exceed the boundary of the active word. As a result, embodiments may omit the operations required to handle overflows.

In some embodiments, the database server 101 may receive a query containing predicates that reference more than one ARLE encoded column of the table 102. As a result, the database server 101 evaluates each predicate on the corresponding column's ARLE encoded data (e.g. using the technique illustrated by FIG. 5) and combines the resulting bit vectors to generate a bit vector that represents the evaluation of the query as a whole. For example, the resulting bit vectors may be combined with AND, OR, XOR operations depending on the relationship between the predicates of the query.

Figure 6:
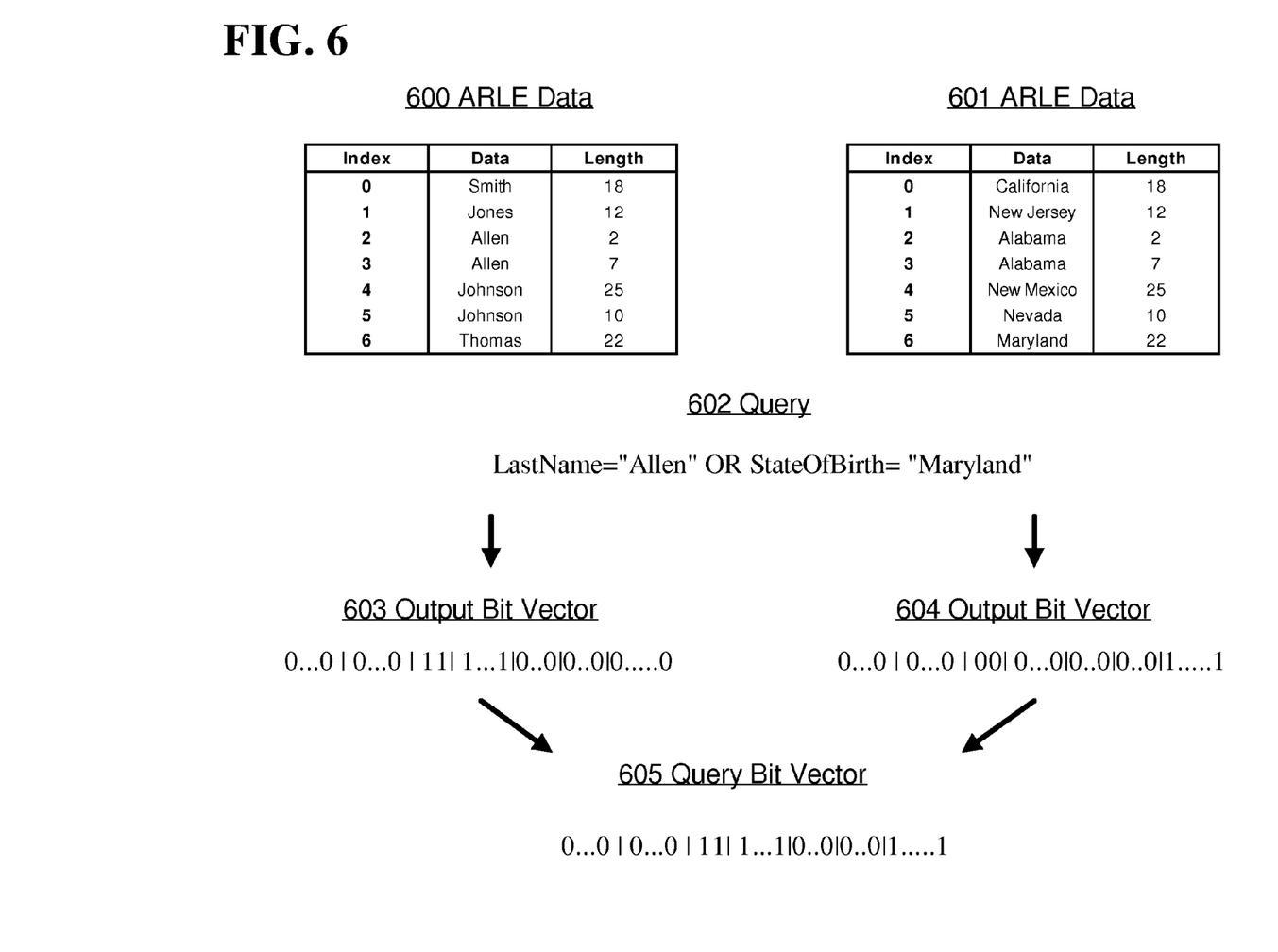
FIG. 6 illustrates the execution of a query that references multiple ARLE encoded columns according to an embodiment.

FIG. 6 illustrates the execution of a query that references multiple ARLE encoded columns according to an embodiment.

In FIG. 6, ARLE data 600 represents an ARLE encoded column storing last names and ARLE data 601 represents an ARLE encoded column storing states of birth. In an embodiment, the database server 101 receives query 602, which finds the records where either the last name is "Allen" or the state of birth is "Maryland". The database server 101 evaluates the first predicate, "LastName='Allen'", against ARLE data 600, resulting in output bit vector 603 and evaluates the second predicate, "StateOfBirth='Maryland'" against ARLE data 601, resulting in output bit vector 604. Since the relationship between the two predicates is an "OR", the database server 101 combines output bit vector 603 and output bit vector 604 using an OR operator to generate query bit vector 605, which represents the records matching query 601.

In an embodiment, the database server 101 returns the records matching the query 602 by decoding the ARLE encoded columns back into uncompressed form and outputting each record that has been marked in the query bit vector 604. Thus, the database server 101 defers the expansion of the ARLE encoded columns until after the query 602 has been fully evaluated.

5.0 Row Lookup

One technique that the database server 101 may use to determine the value of a row given the row's index number is a "linear walk". During a linear walk, the database server 101 inspects the ARLE runs in order and maintains a cumulative total of the run lengths. Once a run is encountered that would push the cumulative total past the index number, the database server 101 determines that the run represents the particular row and therefore returns the run's value. However, the time to perform a linear walk scales based on the number of runs contained within the ARLE data. For large data sets, performing a linear walk each time row lookup is performed can take a significant amount of processing time. In some embodiments, the database server 101 can take advantage of the structure imposed on ARLE data to efficiently perform row lookup.

Figure 7:
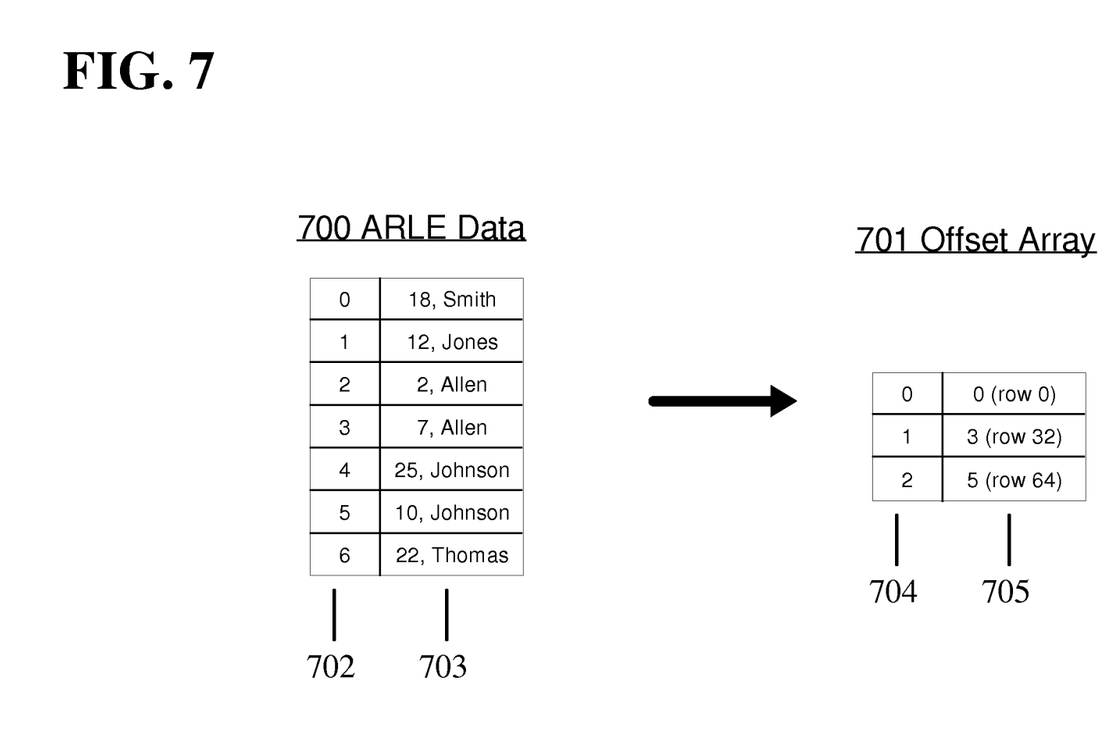
FIG. 7 illustrates an embodiment that constructs an offset array from ARLE data to accelerate row indexing.

FIG. 7 illustrates an embodiment that constructs an offset array 701 from ARLE data 700 to accelerate row lookup. In order to illustrate a clear example, FIG. 7 assumes that ARLE data 700 is aligned at 32 row intervals. In FIG. 7, ARLE data 700 is represented in tabular format, where column 702 represents run offsets and column 703 represents the runs (data value/run length pairs). The offset array 701 is represented in tabular format, where column 704 represents interval offsets and column 705 represents the run offsets in ARLE data 700 which begin each respective interval. Since ARLE data 700 is aligned at 32 row intervals, the first interval (interval 0) contains runs 0-2, the second interval (interval 1) contains runs 3-4, and the third interval (interval 2) contains runs 5-6. As a result, the offset array 701 contains run offset 0 for interval 0, run offset 3 for interval 1, and run offset 5 for interval 2.

In an embodiment, the database server 101 performs row lookup by using the offset array 701 to shortcut the linear walk. Since the size of each interval of the ARLE data 700 is known, the database server 101 is able to directly compute which interval contains the run representing a row at a given index number. The database server 101 uses the interval to index into the offset array 701, providing the database server 101 with the offset of the run which begins the interval. The database server 101 then performs a linear walk starting from the run at the offset provided by the offset array 701. As a result, the database server 101 performs a linear walk only over the interval known to contain the run representing the desired row.

Figure 8:
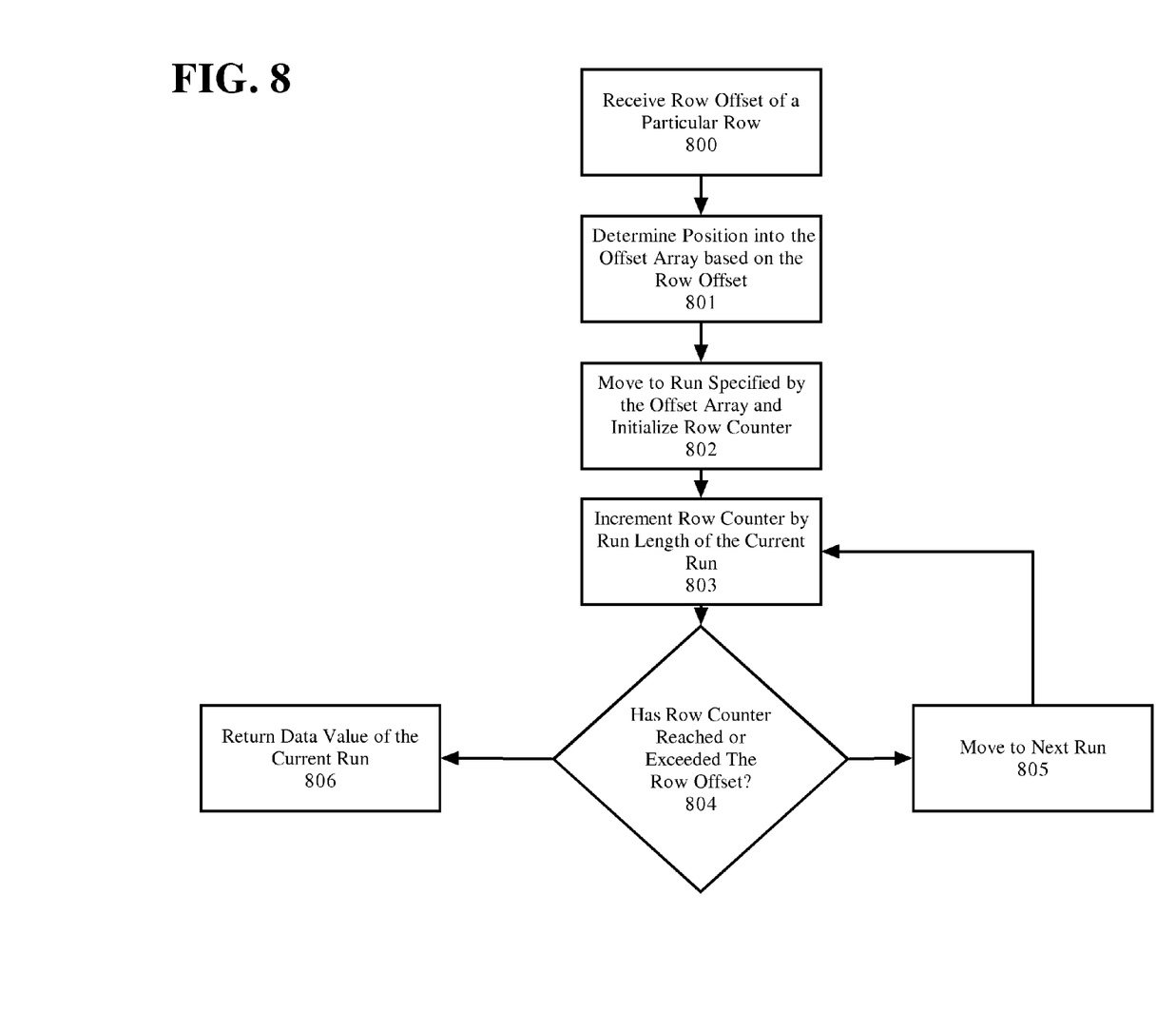
FIG. 8 is a block diagram illustrating an embodiment performing row lookup using an offset array.

FIG. 8 is a block diagram illustrating an embodiment performing row lookup using an offset array. The following explanations assume that database server 101 performs the row lookup of FIG. 8 into ARLE data 700 using offset array 701.

At block 800, database server 101 receives a row index number. However, in some embodiments, rather than receiving an index number, the database server 101 may receive another form of row identification. For example, the database server 101 may identify each row stored within database 100 with a unique identification number, rather than an index number into the specific table containing the row. As a result, the database server 101 may keep track of information that allows the database server 101 to convert the identification number to a row index. For example, assuming the identification numbers are assigned in order, the database server may keep track of the identification number of the first row represented within the ARLE data 700 and shift the identification numbers received at block 800 accordingly to determine row indexes.

At block 801, database server 101 determines a position into the offset array 701 based on the row index number received at block 800. In an embodiment, the database server 101 performs the determination at block 801 by dividing the received index number by the interval size and using the quotient as the position into the offset array 701. Assuming that the interval size is a power of 2, the division can be performed effectively under most processor architectures by utilizing a shift operator.

At block 802, the database server 101 moves to the run at the offset specified by the offset array 701 at block 801. In addition, database server 101 initializes a row counter. In an embodiment, the database server 101 initializes the row counter based on the total number of rows represented by the previous runs of the ARLE data 700 that have been skipped over. For example, the database server 101 may determine the number of rows skipped based on the interval size and the position into the offset array 701 calculated at block 801.

At block 803, the database server 101 increments the row counter by the run length of the current run.

At block 804, the database server determines whether the row counter has reached or exceeded the row index number received at block 800. In response to a determination that the row counter has not reached or exceeded the received row index, the database server 101 proceeds to block 805 and moves to the next run of the ARLE data 700. Otherwise, the database server 101 proceeds to block 806 and returns the data value of the current run.

6.0 Optimizations

While embodiments which utilize ARLE may perform predicate comparisons and row lookup efficiently, compared to techniques such as RLE, there exist cases where ARLE may require an increased amount of space to store the encoded data. Specifically, in RLE, same-valued consecutive rows are always encoded as a single run. However, in ARLE, same-valued consecutive rows may be encoded as multiple runs when those rows cross interval boundaries. Consequently, data containing longer streaks of same-valued consecutive rows (longer run lengths) is more likely to cross an interval boundary, and thus cause ARLE to generate additional runs. Thus, depending on the data set being encoded, the storage and performance tradeoffs between ARLE and RLE may favor one over the other.

In some embodiments, the database server 101 automatically balances the storage and performance tradeoffs between RLE and ARLE when encoding data. In an embodiment, database server 101 determines whether to encode data using RLE or ARLE based on the average run length of the data. For example, the database server 101 may, before encoding a column of a database table, scan and calculate the average run length of the column. When the average run length is below a particular threshold, the database server 101 encodes the column with ARLE. Otherwise, the database server 101 encodes the column with RLE.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
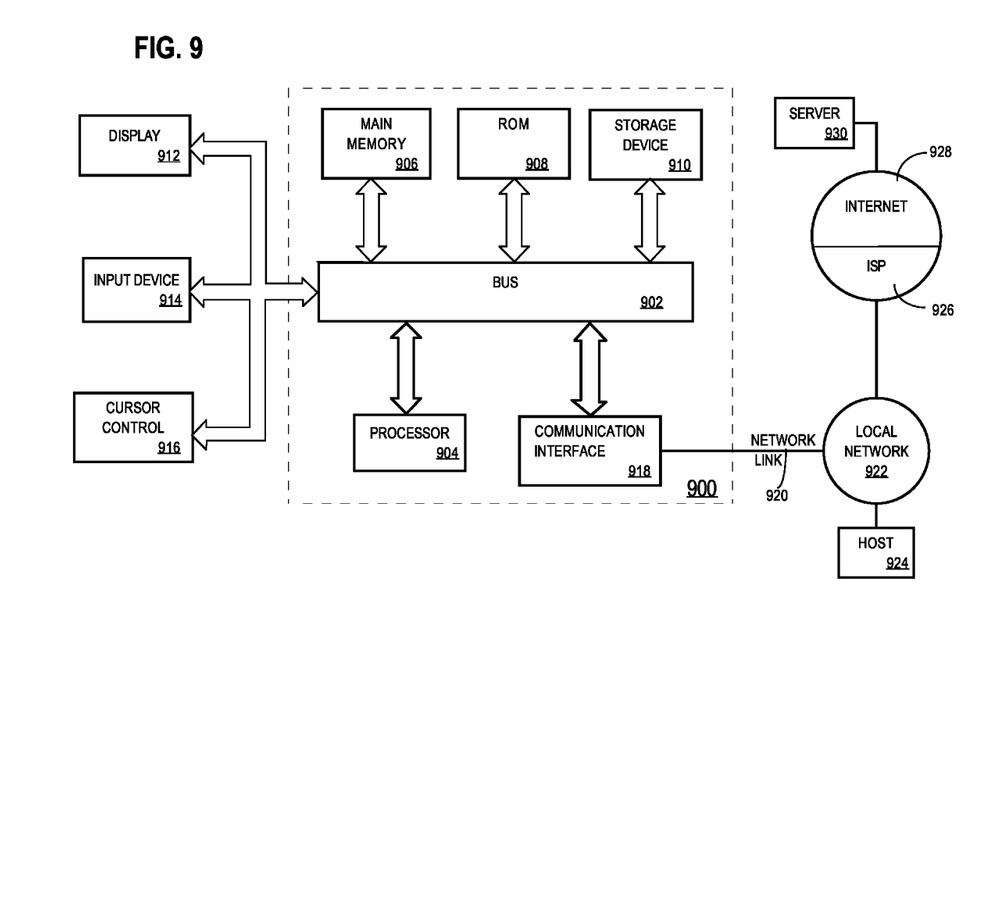
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving tabular data, wherein the tabular data is divided into a plurality of rows, each of which includes data for at least one column;
encoding at least part of the tabular data as a sequence of runs, each run in the sequence containing at least a run length value for an amount of rows represented by the run and a data value common to the rows represented by the run, wherein at least two consecutive runs of the sequence contain a same data value;
wherein the method is performed by one or more computing devices.

2. The method of claim 1, wherein the encoding enforces a boundary between runs of the sequence at intervals based on a threshold number of rows.

3. The method of claim 2, wherein the threshold number of rows is based on a word size of a processor of the one or more computing devices.

4. The method of claim 1, further comprising:
applying a predicate to the encoded tabular data by, for each particular run of the sequence, comparing the predicate to the data value of the particular run and outputting a number of bits based on the run length value of the particular run onto a bit vector, wherein the output for each particular run of the sequence is confined to a single word of the bit vector.

5. The method of claim 2, wherein each row of the plurality of rows is indexed by a row index value and the method further comprising:
in response to receiving an index value of a particular row, determining which run of the sequence represents the particular row.

6. The method of claim 5, wherein determining which run of the sequence represents the particular row comprises:
determining which interval of the sequence contains the run representing the particular row based on the index value of the particular row and the threshold number of rows;
determining a starting run that begins the determined interval;
traversing the sequence in order beginning with the starting run until reaching the run that represents the particular row.

7. The method of claim 6, wherein determining which interval of the sequence contains the run representing the particular row is performed by dividing the index value of the particular row by the threshold number of rows and using a quotient of the division to identify the interval.

8. The method of claim 6, wherein determining the starting run that begins the determined interval is performed by looking up the starting run in an offset index that maps one or more intervals to one or more runs that begin the one or more intervals.

9. The method of claim 6, wherein traversing the sequence is performed by keeping track of a cumulative number of rows represented by previous runs of the sequence and inspecting the rows of the sequence in order beginning with a starting row until the cumulative number of rows reaches a total that equals or exceeds the index value of the particular row.

10. A non-transitory computer-readable medium storing instructions, which when executed by one or more processors, cause the processors to perform steps comprising:
receiving tabular data, wherein the tabular data is divided into a plurality of rows, each of which includes data for at least one column;
encoding at least part of the tabular data as a sequence of runs, each run in the sequence containing at least a run length value for an amount of rows represented by the run and a data value common to the rows represented by the run, wherein at least two consecutive runs of the sequence contain a same data value.

11. The non-transitory computer-readable medium of claim 10, wherein the encoding enforces a boundary between runs of the sequence at intervals based on a threshold number of rows.

12. The non-transitory computer-readable medium of claim 11, wherein the threshold number of rows is based on a word size of a processor of the one or more computing devices.

13. The non-transitory computer-readable medium of claim 10, wherein the steps further comprise:
applying a predicate to the encoded tabular data by, for each particular run of the sequence, comparing the predicate to the data value of the particular run and outputting a number of bits based on the run length value of the particular run onto a bit vector, wherein the output for each particular run of the sequence is confined to a single word of the bit vector.

14. The non-transitory computer-readable medium of claim 11, wherein each row of the plurality of rows is indexed by a row index value and the steps further comprise:
in response to receiving an index value of a particular row, determining which run of the sequence represents the particular row.

15. The non-transitory computer-readable medium of claim 14, wherein determining which run of the sequence represents the particular row comprises:
determining which interval of the sequence contains the run representing the particular row based on the index value of the particular row and the threshold number of rows;
determining a starting run that begins the determined interval;
traversing the sequence in order beginning with the starting run until reaching the run that represents the particular row.

16. The non-transitory computer-readable medium of claim 15, wherein determining which interval of the sequence contains the run representing the particular row is performed by dividing the index value of the particular row by the threshold number of rows and using a quotient of the division to identify the interval.

17. The non-transitory computer-readable medium of claim 15, wherein determining the starting run that begins the determined interval is performed by looking up the starting run in an offset index that maps one or more intervals to one or more runs that begin the one or more intervals.

18. The non-transitory computer-readable medium of claim 15, wherein traversing the sequence is performed by keeping track of a cumulative number of rows represented by previous runs of the sequence and inspecting the rows of the sequence in order beginning with a starting row until the cumulative number of rows reaches a total that equals or exceeds the index value of the particular row.

19. A method comprising:
receiving tabular data, wherein the tabular data is divided into a plurality of rows, each of which includes data for at least one column;
encoding at least part of the tabular data as a sequence of runs, each run in the sequence containing at least a run length value for an amount of rows represented by the run and a data value common to the rows represented by the run, the encoding being performed by at least:
scanning rows of the at least part of the tabular data while building a current run, on reaching a particular row of the at least part of the tabular data, determining that a threshold number of rows have been scanned since a last enforced boundary between runs of the sequence and in response outputting the current run onto the sequence and beginning a new run;
wherein the method is performed by one or more computing devices.

20. The method of claim 19, wherein the threshold number of rows is based on a word size of a processor of the one or more computing devices.

\* \* \* \* \*